United States Patent [19]

Otsubo et al.

[11] Patent Number: 5,206,813
[45] Date of Patent: Apr. 27, 1993

[54] GRAPHIC DISPLAY METHOD FOR NUMERICAL CONTROLLER

[75] Inventors: Yukinori Otsubo; Tomohiro Suzuki; Yasushi Fukaya, all of Ooguchi, Japan

[73] Assignee: Kabushiki Kaisha Okuma Tekkosho, Aichi, Japan

[21] Appl. No.: 798,365

[22] Filed: Nov. 21, 1991

Related U.S. Application Data

[63] Continuation of Ser. No. 441,151, Nov. 15, 1989, abandoned.

[30] Foreign Application Priority Data

Nov. 15, 1988 [JP] Japan ................. 63-287905

[51] Int. Cl.$^5$ ............................... G06F 15/46
[52] U.S. Cl. ...................... 364/474.24; 364/474.26; 364/474.3; 318/571
[58] Field of Search .......... 364/474.15, 474.22, 364/474.25, 474.26, 474.3, 474.31, 474.34, 188, 189; 318/571

[56] References Cited

U.S. PATENT DOCUMENTS

| | | | |
|---|---|---|---|
| 4,571,670 | 2/1986 | Kishi et al. | 364/474.26 |
| 4,646,247 | 2/1987 | Otsuki | 364/474.26 |
| 4,698,573 | 10/1987 | Niwa | 364/474.3 |
| 4,788,481 | 11/1988 | Niwa | 364/474.26 |
| 4,831,542 | 5/1989 | Shima et al. | 364/474.26 |
| 4,912,625 | 3/1990 | Glatfelter | 364/474.26 |

Primary Examiner—Jerry Smith
Assistant Examiner—Thomas E. Brown
Attorney, Agent, or Firm—Wenderoth, Lind & Ponack

[57] ABSTRACT

When a position of a tool blade tip for displaying the work shape, tool shape and tool locus is calculated by an interpolation arithmetic operation based on the interpolation instruction and feed speed instruction within a numerical control data, the calculated position of the tool blade tip is compared with the display scope every time an interpolation arithmetic operation is conducted; a determination is made as to whether or not the tool shape and tool locus to be displayed are inside of the display scope, and when they exist outside, uses a higher speed as the feed speed for the interpolation arithmetic operation. Therefore, even when an operator tries to check numerical control data by reducing the display scope for local graphic display, the interpolation outside the display scope can be conducted at a higher speed to thereby allow the operator to check the numerical control data quickly and immediately.

4 Claims, 6 Drawing Sheets

GRAPHIC DISPLAY METHOD FOR NUMERICAL CONTROLLER

This application is a continuation of now abandoned application Ser. No. 441,151 filed on Nov. 15, 1989.

BACKGROUND OF THE INVENTION

This invention relates to a graphic display method for a numerical controller which displays on a graphic display device the shape of a work and the shape and locus of a tool within a designated display scope based on numerical control data.

There has been known in the prior art a function for process simulation which displays the shape of a work and the shape and locus of a tool on a graphic display device in order to check numerical control data prior to machining by a numerically controlled machine or a tool. The prior art process simulation function will now be described referring to a block diagram shown in FIG. 1 and a flowchart shown in FIG. 2.

The numerical control data 1 for process simulation are read-in by a reading/analyzing section 2, and the reading/analyzing section 2 extracts an interpolation instruction $I_c$ and a feed speed instruction $F_c$ from the numerical control data 1, and sends them to an interpolation arithmetic section 3 (Step S1). The interpolation arithmetic section 3 conducts an interpolation arithmetic operation based on the interpolation instruction $I_c$ and the feed speed instruction $F_c$ to calculate a position of a tool blade tip $T_p$ (Step S2). It also transfers the obtained position of the tool blade tip $T_p$ to a work shape drawing section 4, a tool shape drawing section 5, and a tool locus drawing section 6. The above three sections 4, 5 and 6 have respectively display scopes $A_c$ which have been set from a keyboard 9. The work shape drawing section 4 compares the position of the tool blade tip $T_p$ which is just received from the interpolation arithmetic section 3 with the display scope $A_c$ which has been set from the keyboard 9 in advance (Step S3), and when the position of the tool blade tip $T_p$ exists within the display scope $A_c$, it sequentially recognizes the portion which is to be cut off from the work based on the previous position of the tool blade tip and the current position of the tool blade tip $T_p$, generates drawing data $W_i$ for the work as shown in FIG. 3A with a shaded portion and sends it to a display controlling section 7. The tool shape drawing section 5 generates drawing data $T_i$ for the tool shape as shown in FIG. 3B if the position of the tool blade tip $T_p$ is within the display scope $A_c$, and transfers the drawing data $T_i$ for the tool shape to the display controlling section 7. Similarly, the tool locus drawing section 6 recognizes the locus of the movement of the tool based on the previous position of the tool blade tip and the current position of the tool blade tip $T_p$ if the position of the tool blade tip $T_p$ received from the interpolation arithmetic section 3 exists within the display scope $A_c$, and generates drawing data $L_i$ for the tool locus as shown in FIG. 3C to transfer it to the display controlling section 7 (Step S3 and S4). The display controlling section 7 synthesizes the drawing data $W_i$ for the work shape, the drawing data $T_i$ for the tool shape and the drawing data $L_i$ for the tool locus, and displays them graphically on a graphical display device 8 as shown in FIG. 4 (Step S5). The numerical controller determines whether or not the numerical control data 1 is completed (Step S6), and if not, repeats the above actions (Step S1 through S5).

In the display method described above, it is assumed that a display scope $A_c$ is designated smaller than the work shape as shown in FIG. 5. In this case, even if the position of the tool blade tip $T_p$ exists outside the display scope $A_c$, the interpolation arithmetic section 3 conducts interpolation calculation in accordance with the feed speed instruction $F_c$ contained in the numerical control data 1. Therefore, even when an operator tries to conduct a graphic display locally by setting the display scope $A_c$ smaller, an unnecessary interpolation is conducted outside the display scope $A_c$ as shown by dotted line, and the operator cannot quickly check the numerical control data 1.

SUMMARY OF THE INVENTION

This invention was contrived to eliminate aforementioned defects encountered in the prior art and aims to provide a graphic display method for the numerical controller which is free of such defects.

According to one aspect of this invention, for achieving the object described above, there is provided a graphic display method for a numerical controller of the type in which a work shape, a tool shape and a tool locus within a designated display scope are displayed based on numerical control data by a graphic display device, which comprises the steps of: comparing a calculated position of the tool blade tip and said display scope every time an interpolation arithmetic operation is conducted when the calculated position of the tool blade tip for displaying said work shape, said tool shape and said tool locus is calculated by the interpolation arithmetic operation using the interpolation instruction and feed speed instruction within said numerical control data; determining if said tool shape and locus to be displayed are inside or outside of the display scope; and increasing the feed speed which is to be used for said interpolation arithmetic operation if the tool shape and locus are outside of the display scope.

According to another aspect of this invention, there is provided a graphic display method for a numerical controller of the type in which a work shape, a tool shape and a tool locus within a designated display scope are displayed based on numerical control data by a graphic display device, which comprises the steps of: reading in numerical control data and extracting an interpolation instruction therefrom and feed speed instruction; receiving an identifying signal for identifying whether or not a current position of a tool blade tip exists inside the display scope; using the received feed speed instruction as the feed speed instruction for interpolation if the position of the tool blade tip exists inside said display scope; using a preset feed speed instruction as the feed speed instruction for interpolation if the position of the tool blade tip exists outside said display scope; calculating the position of the tool blade tip by an interpolation arithmetic operation based on said interpolation instruction and feed speed instruction; determining whether or not the input position of the tool blade tip exists inside of said display scope; sending an identifying signal based on the result of the determining; transferring said position of the tool blade tip to a work shape drawing section, a tool shape drawing section and a tool locus drawing section if the input position of the tool blade tip simultaneously exists inside said display scope; forming drawing information for the portion of the work to be cut off, a tool shape and a tool locus; and displaying respective drawing information on said graphic display device.

The naturem principle and utility of the invention will become more apparent from the following detailed description when read in conjunction with the accompanying drawings.

DESCRIPTION OF THE PREFERRED EMBODIMENTS

Figure 1:
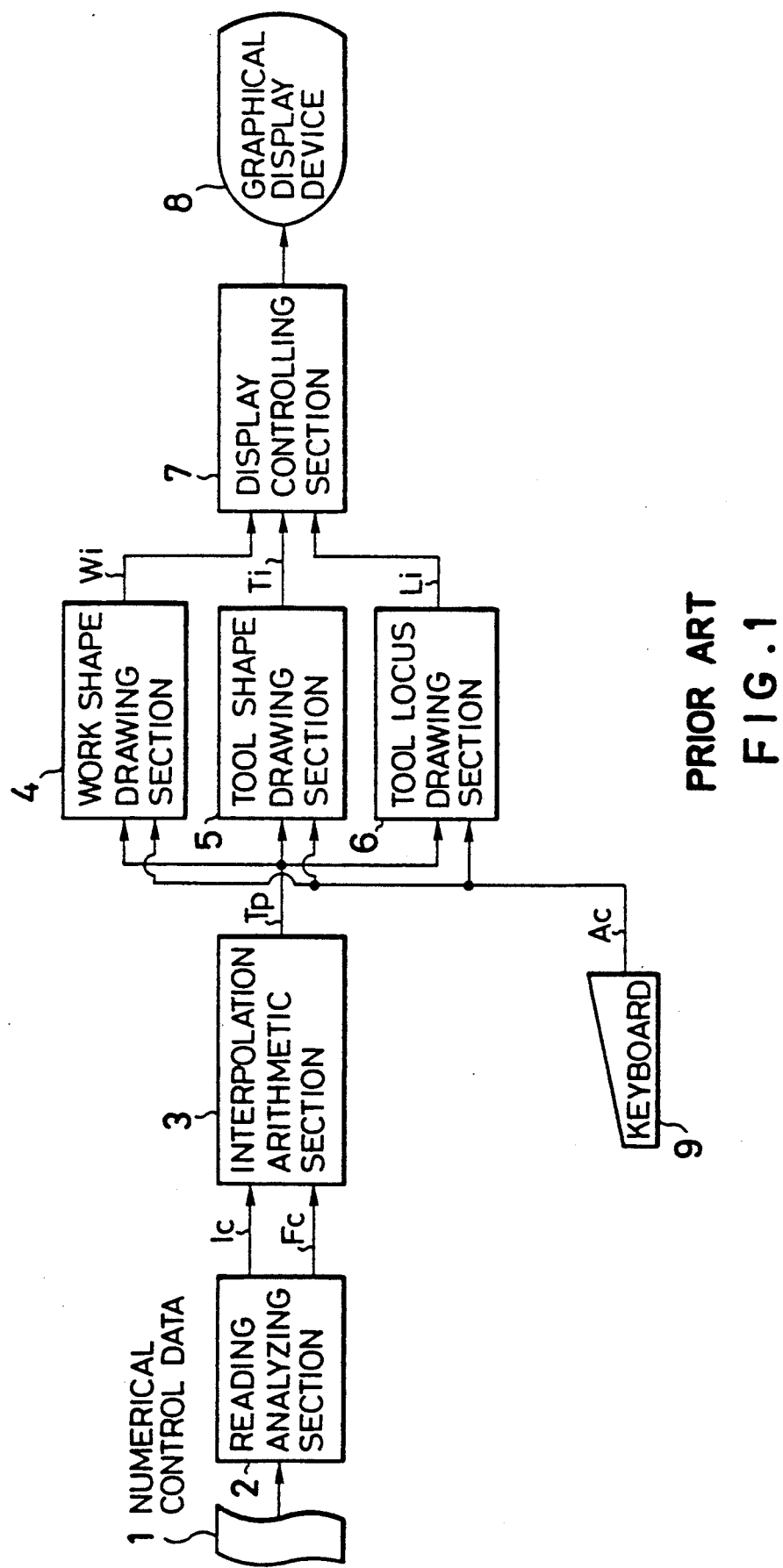
FIG. 1 is a block diagram showing a numerical controller realized by a prior art graphic display method.
Figure 2:
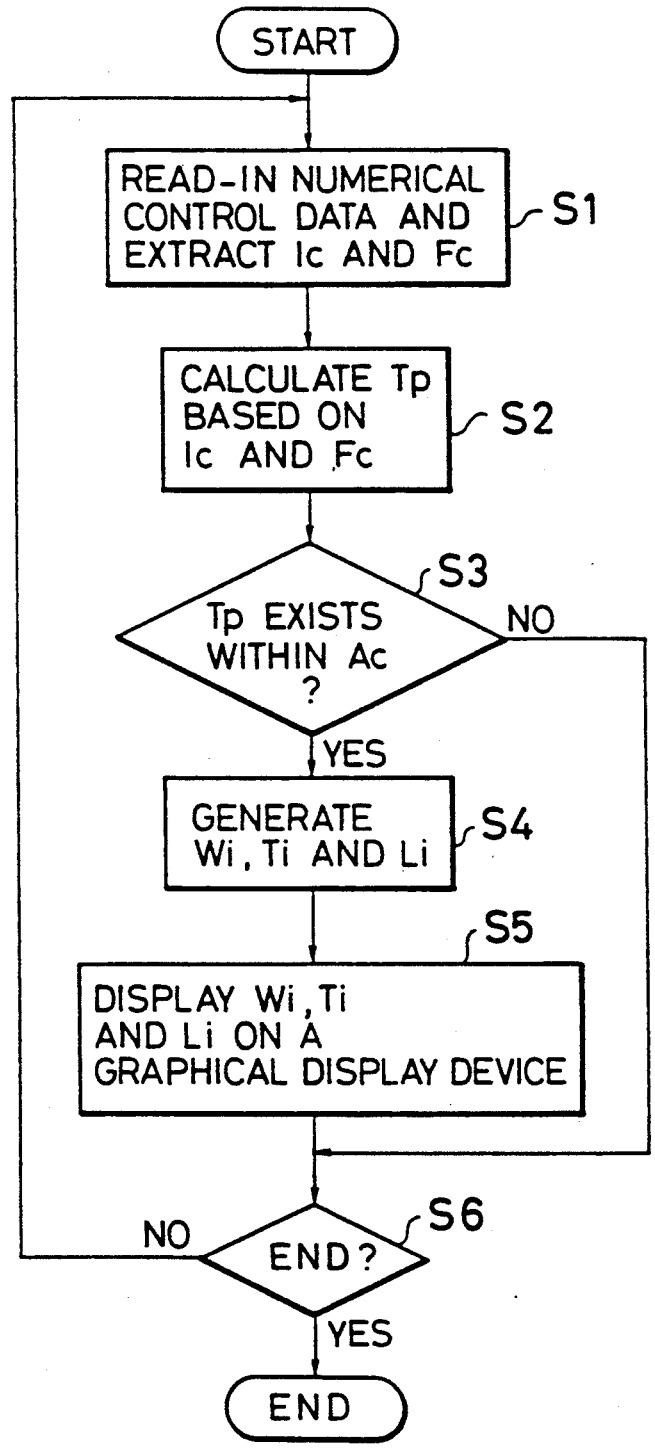
FIG. 2 is a flowchart showing an example of the actions of the controller of FIG. 1.
Figure 3A:
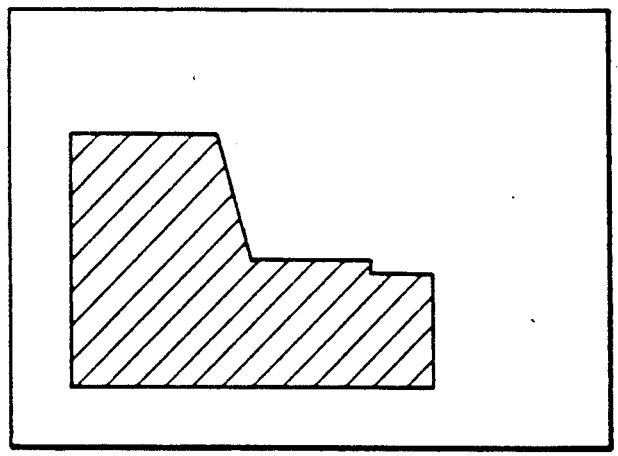
FIGS. 3A through 3C, 4 and 5 are displays used to explain the actions of the controller of FIG. 1.
Figure 3B:
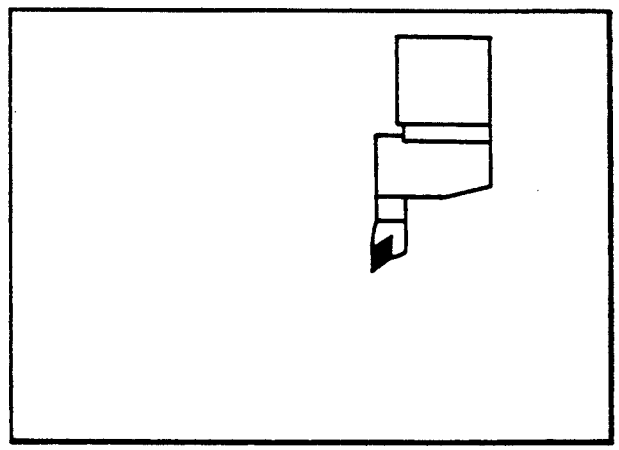
Figure 3C:
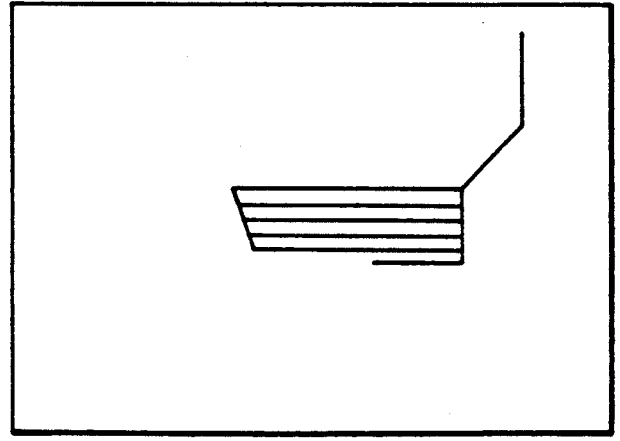
Figure 4:
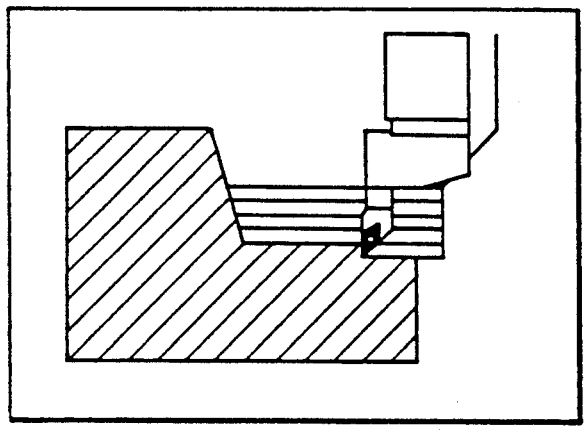
Figure 5:
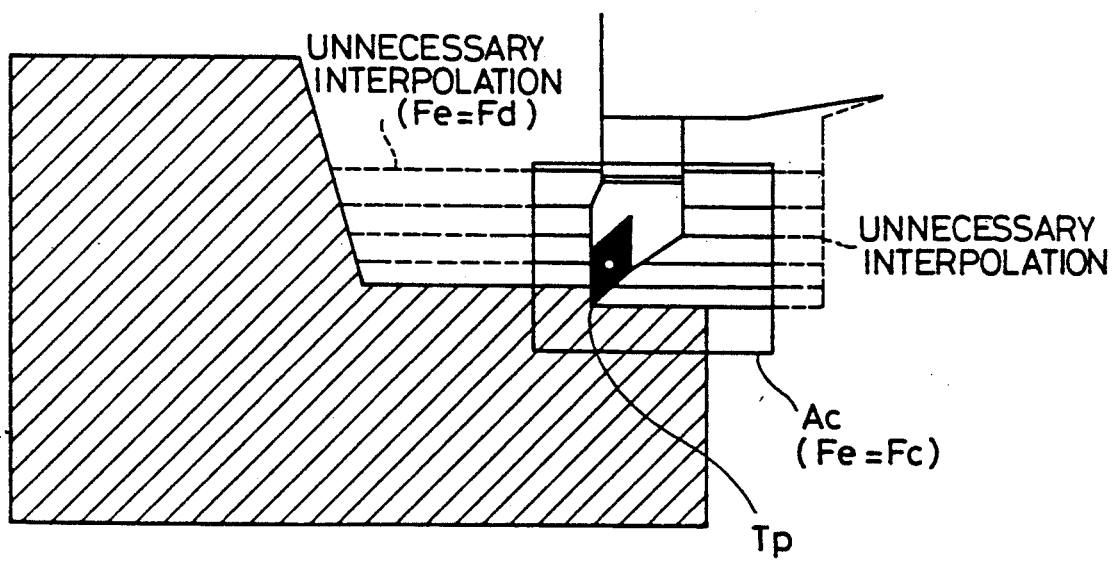
Figure 6:
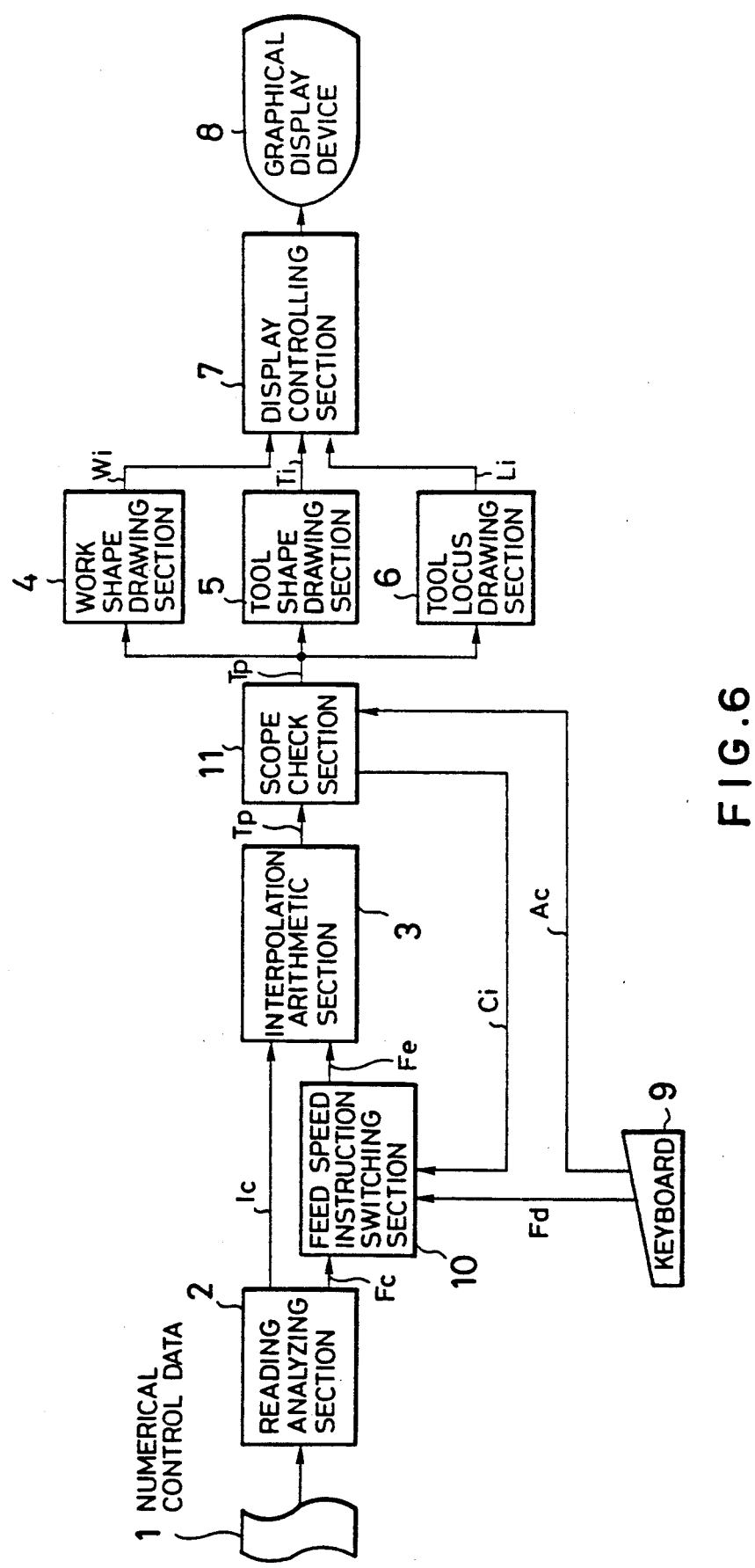
FIG. 6 is a block diagram showing a numerical controller realized by an embodiment of this invention method.

A numerical controller realized by an embodiment of this invention method is shown in FIG. 6 in correspondence to FIG. 1. According to this invention, a feed speed instruction switching section 10 is not only inputted with the feed speed instruction $F_c$ from the reading-/analyzing section 2 but also with the feed speed instruction $F_d$ from the keyboard 9, and a scope check section 11 is additionally provided to receive as input the position of the tool blade tip $T_p$ from the interpolation arithmetic section 3 and the display scope $A_c$ from the keyboard 9 and the identifying signals $C_i$ from the scope check section 11 are inputted at the feed speed instruction switching section 10, which in turn outputs the feed speed instruction $F_e$.

Figure 7:
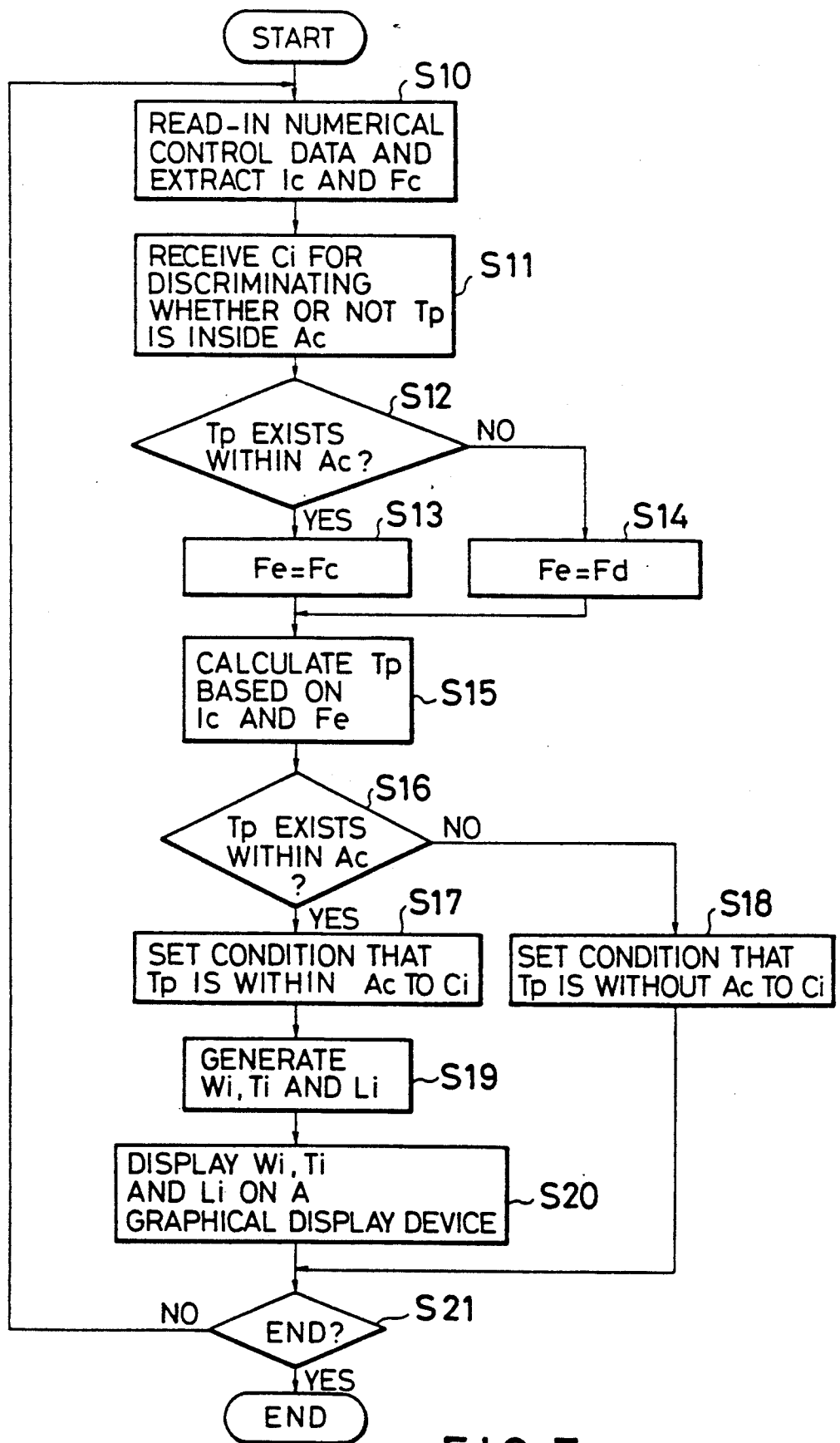
FIG. 7 is a flowchart showing an example of the actions of the controller of FIG. 6.

The operations of the numerical controller having the above structure will now be explained referring to the flowchart shown in FIG. 7.

The numerical control data 1 is read-in by the reading/analyzing section 2. The reading/analyzing section 2 extracts the interpolation instruction $I_c$ and the feed speed instruction $F_c$, and transfers the interpolation instruction $I_c$ to the interpolation arithmetic section 3 and the feed speed instruction $F_c$ to the feed speed instruction switching section (Step S10). The feed speed instruction switching section 10 has been inputted with and set at a feed speed instruction $F_d$ from the keyboard 9 at the state where the position of the tool blade tip $T_p$ exists outside the display scope $A_c$ to hold the relationship $F_d>>F_c$. The feed speed instruction switching section 10 receives an identifying signal $C_i$ from the scope check section 11 for determining whether or not the position of the tool blade tip $T_p$ is inside the display scope $A_c$ (Step S11), and if the position of the tool blade tip $T_p$ exists inside the scope $A_c$, the feed speed instruction switching section 10 transfers the feed speed instruction $F_c$ sent from the reading/analyzing section 2 to the interpolation arithmetic section 3 as the feed speed instruction $F_e$ at the time of interpolation. (the relationship $F_e=F_c$ holds). When the position of the tool blade tip $T_p$ exists outside the display scope $A_c$, the feed speed instruction switching section 10 transfers the feed speed instruction $F_d$ which has been set in advance from the keyboard 9 to the interpolation arithmetic section 3 as the feed speed instruction $F_e$ at the time of interpolation. (the relationship $F_e=F_d$ holds) (Step S12-S14). The interpolation arithmetic section 3 conducts an interpolation operation based on the interpolation instruction $I_c$ and the feed speed instruction $F_e$ to calculate the position of the tool blade tip $T_p$ (Step S15), and sends the calculated position to the scope check section 11. The scope check section 11 determines if the input position of the tool blade tip $T_p$ exists inside our outside the display scope $A_c$ which has been preset from the keyboard 9 (Step S16), and transfers an identifying signal $C_i$ based on the result of the determination to the feed speed instruction switching section 10 (Step S17, S18). The scope check section 11 also transfers the position of the tool blade tip $T_p$ to the work shape drawing section 4, the tool shape drawing section 5 and the tool locus drawing section 6 when the position of the tool blade tip $T_p$ exists inside the display scope $A_c$.

Subsequent to the above, the work shape drawing section 4, the tool shape drawing section 5, the tool locus drawing section 6, the display controlling section 7 and the graphic display device 8 repeat the same actions as the prior art described in relation to FIG. 1 (Step S19 through S21).

As described in the foregoing, according to this invention method, as the feed speed used in the interpolation when the position of the tool blade tip exists outside the display scope is kept high, the time wasted by unnecessary interpolation when the display scope is made small can be shortened. Therefore, when an operator sets the display scope smaller for a local graphic display, he is able to check numerical control data with a higher speed.

It should be understood that many modifications and adaptations of the invention will become apparent to those skilled in the art and it is intended to encompass such obvious modifications and changes in the scope of the claims appended hereto.

What is claimed is:

1. A graphic display method in which a work shape, a tool shape and a tool locus of a numerical control machining operation are simulated and displayed on a graphic display device, said method comprising:

a step of defining a display subregion of an overall work region, the overall work region constituting a entirety of a work area of the numerical control machining operation, the display subregion constituting a subportion of the overall work region;

a step of repeatedly interpolating a tool tip position based on an interpolation instruction generated in accordance with numerical control data and based on one of a first feed speed generated in accordance with the numerical control data or a second feed speed which is greater than the first feed speed;

a step of determining, after each interpolation of said interpolating step, whether the tool tip position interpolated in said interpolating step is within the display subregion defined in said defining step, wherein a next interpolation of said interpolating step is based on the first feed speed when the tool tip position is within the display subregion, and wherein the next interpolation of said interpolating step is based on the second feed speed when the tool tip position is external the display subregion; and a step of displaying on the graphic display device, after each interpolation of said interpolating step, the work shape, tool shape and tool locus within the display subregion.

2. A method as recited in claim 1, wherein display data denoting the work shape, tool shape and tool locus are renewed after each interpolation of said interpolating step in which the tool tip position is determined to be within the display subregion.

3. A graphic display method in which a work shape, a tool shape and a tool locus of a numerical control machining operation are simulated and displayed on a graphic display device, said method comprising:

a first step of defining a display subregion of an overall work region, the overall work region constituting a entirety of a work area of the numerical control machining operation, the display subregion constituting a subportion of the overall work region;

a second step of interpolating a tool tip position based on an interpolation instruction generated in accordance with numerical control data and based on a first feed speed generated in accordance with the numerical control data;

a third step of determining whether the interpolated tool tip position is within the display subregion;

when the tool tip position is within the display subregion, a fourth step of (a) generating display data denoting the work shape, tool shape and tool locus associated with the interpolated tool tip position, and (b) returning to said second step to interpolate a next tool tip position;

when the took tip position is external the display subregion, a fifth step of (a) interpolating a next tool tip position based on the interpolation instruction and based on a second feed speed which is greater than the first feed speed, and (b) returning to said third step with respect to the thus interpolated next tool tip position.

4. A method as recited in claim 3, wherein said fourth step further includes displaying the display subregion on the graphics display device in accordance with the display data.

* * * * *